US009115666B2

(12) United States Patent
Chasman et al.

(10) Patent No.: US 9,115,666 B2
(45) Date of Patent: Aug. 25, 2015

(54) SLOTTED MULTI-NOZZLE GRID WITH INTEGRATED COOLING CHANNELS

(71) Applicant: Raytheon Company, Waltham, MA (US)

(72) Inventors: Daniel Chasman, Tucson, AZ (US); Stephen D. Haight, Oro Valley, AZ (US); James K. Villarreal, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 94 days.

(21) Appl. No.: 13/647,599

(22) Filed: Oct. 9, 2012

(65) Prior Publication Data

US 2014/0096510 A1   Apr. 10, 2014

(51) Int. Cl.
*F02K 9/30*   (2006.01)
*F02K 9/97*   (2006.01)

(52) U.S. Cl.
CPC ... *F02K 9/30* (2013.01); *F02K 9/97* (2013.01); *F02K 9/972* (2013.01); *Y10T 29/49346* (2015.01)

(58) Field of Classification Search
CPC ............. F02K 9/30; F02K 9/97; F02K 9/972; Y10T 29/49346
USPC ................................ 60/263, 200.1, 265, 229
See application file for complete search history.

(56) References Cited

U.S. PATENT DOCUMENTS

| | | | |
|---|---|---|---|
| 2,967,393 A | 1/1961 | von Braun | |
| 3,115,747 A | 12/1963 | Yu | |
| 5,511,535 A * | 4/1996 | Landstrom et al. | 126/25 C |
| 8,117,847 B2 * | 2/2012 | Haight et al. | 60/771 |
| 2004/0084566 A1 * | 5/2004 | Chasman | 244/74 |
| 2010/0000511 A1 * | 1/2010 | Koropoulis | 126/25 R |
| 2012/0233979 A1 | 9/2012 | Chasman et al. | |

FOREIGN PATENT DOCUMENTS

WO   WO 2006/115605 A1   11/2006

OTHER PUBLICATIONS

Notification of Transmittal of the International Search Report and the Written Opinion of the International Searching Authority, or the Declaration dated Dec. 5, 2013 in connection with International Patent Application No. PCT/US2013/054401.

* cited by examiner

*Primary Examiner* — Ehud Gartenberg
*Assistant Examiner* — Jason H Duger (57) ABSTRACT

An apparatus includes a slotted multi-nozzle grid with a plate having multiple elongated slotlettes through the plate. Each of at least some of the slotlettes has a convergent input, a divergent output, and a narrower throat portion separating the convergent input and the divergent output. At least some of the slotlettes are arranged in multiple rows. The plate further includes multiple cooling channels through the plate. At least some of the cooling channels are located between the rows of slotlettes. Each cooling channel is configured to transport coolant through the plate in order to cool the plate, such as to cool the plate as hot combustion gases pass through the plate. Each of at least some of the rows may include at least two slotlettes, and two adjacent slotlettes in one row may be separated by a structural ligament (which may have a teardrop cross-sectional shape).

20 Claims, 8 Drawing Sheets

SLOTTED MULTI-NOZZLE GRID WITH INTEGRATED COOLING CHANNELS

TECHNICAL FIELD

This disclosure is generally directed to propulsion systems. More specifically, this disclosure relates to a slotted multi-nozzle grid (MNG) with integrated cooling channels.

BACKGROUND

Certain types of vehicles, such as rockets, include one or more nozzles as part of a liquid propulsion system. In a liquid propulsion system, a liquid propellant is ignited, and one or more nozzles expand and accelerate the resulting combustion gases. As a result, the gases exit the nozzles at very high speeds, propelling the vehicle in a desired direction.

Cylindrical- or cone-shaped nozzles have been used for many years. Unfortunately, these types of nozzles are often quite large. As a result, these types of nozzles may not be desirable in certain situations due to volume or weight limitations. A multi-nozzle grid (MNG) is a two-dimensional or three-dimensional collection of small nozzles called "nozzlettes" in a grid pattern. A multi-nozzle grid can provide the same performance as a conventional cylindrical- or cone-shaped nozzle but in a much smaller space.

SUMMARY

This disclosure provides a slotted multi-nozzle grid (MNG) with integrated cooling channels. The cooling channels are configured to utilize a coolant to remove heat energy from the MNG, such as when hot combustion gases flow through the MNG, thereby helping to prevent the MNG from being damaged by the heat energy.

In a first embodiment, an apparatus includes a slotted multi-nozzle grid with a plate having multiple elongated slotlettes through the plate. Each of at least some of the slotlettes has a convergent input, a divergent output, and a narrower throat portion separating the convergent input and the divergent output. At least some of the slotlettes are arranged in multiple rows. The plate further includes multiple cooling channels through the plate. At least some of the cooling channels are located between the rows of slotlettes. Each cooling channel is configured to transport coolant through the plate in order to cool the plate.

In a second embodiment, a system includes a combustion chamber configured to generate combustion gases. The system also includes a slotted multi-nozzle grid connected to an outlet of the combustion chamber and through which at least some of the combustion gases pass. The slotted multi-nozzle grid includes a plate. The plate includes multiple elongated slotlettes through the plate. Each of at least some of the slotlettes has a convergent input, a divergent output, and a narrower throat portion separating the convergent input and the divergent output. At least some of the slotlettes are arranged in multiple rows. The plate also includes multiple cooling channels through the plate. At least some of the cooling channels are located between the rows of slotlettes. Each cooling channel is configured to transport coolant through the plate in order to cool the plate.

In a third embodiment, a method includes forming a slotted multi-nozzle grid having a plate. Forming the slotted multi-nozzle grid includes forming multiple elongated slotlettes through the plate. Each of at least some of the slotlettes has a convergent input, a divergent output, and a narrower throat portion separating the convergent input and the divergent output. At least some of the slotlettes are arranged in multiple rows. Forming the slotted multi-nozzle grid also includes forming multiple cooling channels through the plate. At least some of the cooling channels are located between the rows of slotlettes. Each cooling channel is configured to transport coolant through the plate in order to cool the plate.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 7, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1A:
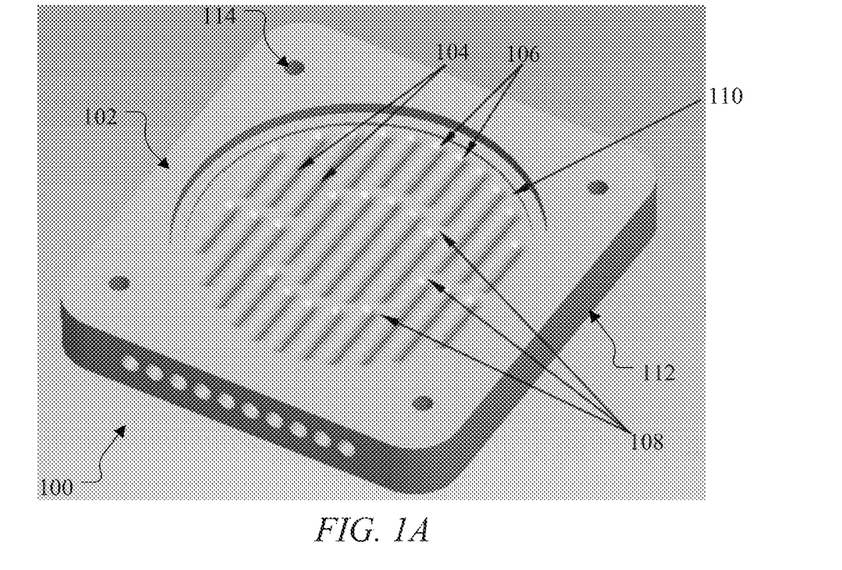
FIGS. 1A and 1B illustrate an example slotted multi-nozzle grid (MNG) with integrated cooling channels in accordance with this disclosure.
Figure 1B:
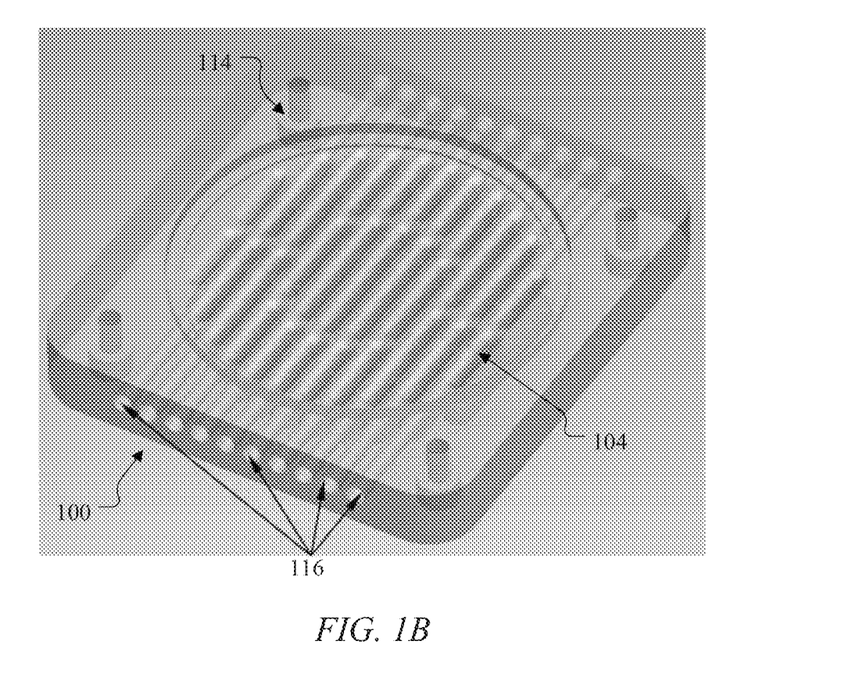

FIGS. 1A and 1B illustrate an example slotted multi-nozzle grid (MNG) 100 with integrated cooling channels in accordance with this disclosure. As shown in FIG. 1A, the MNG 100 includes a plate 102 having multiple slotlettes 104 formed through the plate 102. The slotlettes 104 allow combustion gases or other material to pass through the plate 102 during operation of a larger device or system. The use of multiple slotlettes 104 in the plate 102 can help ease production requirements and yet allow the MNG 100 to conform to the laws of fluid mechanics, thermodynamics, and structural mechanics. Moreover, the use of multiple slotlettes 104 in the plate 102 can help to shorten the overall length of the MNG 100 compared to conventional nozzles, which could be useful in applications where volume or mass limitations prevent use of conventional nozzles. The MNG 100 could be used in any suitable device or system. As particular examples, the MNG 100 could be used in third-stage rocket motors, divert thrusters, and thrusters of attitude control systems.

The plate 102 could be formed from any suitable material(s) and in any suitable manner. For example, the plate 102 could represent a single machined piece or a molded plate of a homogenous monolithic material or composite material. Each slotlette 104 could represent any suitable elongated nozzle structure. The MNG 100 could include any suitable number of slotlettes 104 in any suitable configuration.

In this example, the slotlettes 104 are arranged in multiple rows 106, and adjacent slotlettes 104 in a row 106 are separated by structural ligaments 108. The structural ligaments 108 help to maintain the structural strength and stiffness of the slotted plate 102. The number of slotlettes 104 in a row 106 (and thus the number of structural ligaments 108 in a row 106) can vary and may be determined by performance (such as volume flow and velocity of discharge gases) and structural requirements of the desired application. The total number of rows 106 in the plate 102 can also be determined by the desired performance and structural requirements of the MNG 100. Each structural ligament 108 includes any suitable portion of a plate between slotlettes in a row of slotlettes.

In this example, an upper surface 110 of the MNG 100 represents the convergent side of the MNG 100, and a lower surface 112 of the MNG 100 represents the divergent side of the MNG 100. Gas enters the slotlettes 104 from the convergent side and exits the slotlettes 104 on the divergent side. The plate 102 also includes multiple flanges 114 that allow bolts or other connectors to couple the plate 102 to a combustion chamber or other structure so that material flows into the MNG 100 through the surface 110.

As shown in FIGS. 1A and 1B, the plate 102 includes multiple cooling channels 116. The cooling channels 116 denote substantially straight elongated orifices or paths through which coolant can flow through the plate 102. The cooling channels 116 can be parallel and coplanar as shown here. The cooling channels 116 are interdigitated or interleaved between the rows 106 of slotlettes 104. However, the cooling channels 116 could be arranged in other geometries or in a pattern with headers and multiple connecting channels between headers.

Each cooling channel 116 represents any suitable passageway for coolant to flow through a multi-grid nozzle. In this example, each cooling channel 116 represents a generally cylindrical passageway with wider ends, although any other suitable cross-sectional shape(s) could be used. Any suitable coolant can be used in the cooling channels 116, such as a liquid fuel, an oxidizer, water, a water and ethylene glycol mixture, atmospheric gas, or cryogenic gas.

Figure 3:
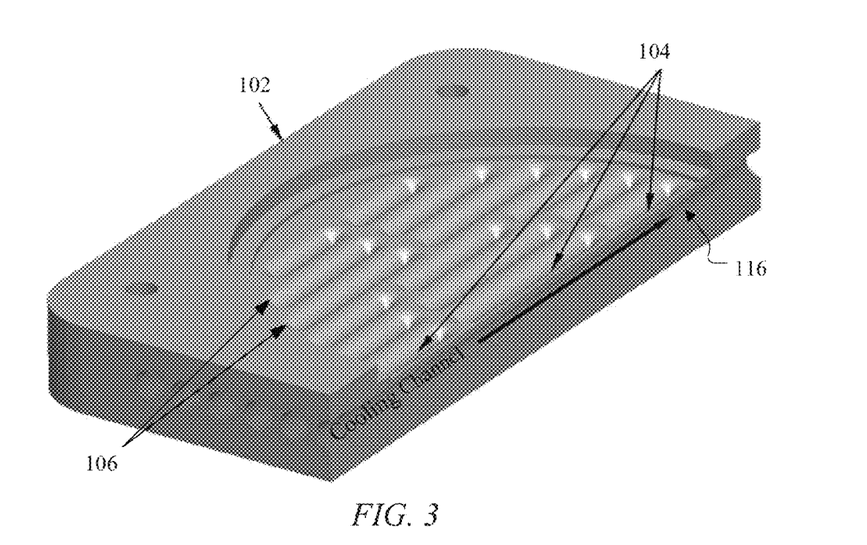

As shown in FIG. 3 described below, the slotlettes 104 are supported by ribs that form three-dimensional endings of the slotlettes 104, thus providing both efficient flow accelerators in converging-diverging nozzles and structural reinforcements. The rows 106 of slotlettes 104 in FIG. 1A bound the structural tubes that contain the cooling channels 118, allowing coolant to flow through the cooling channels 118 and through the plate 102 to transfer heat from the plate 102 to the coolant.

Among other things, the use of the cooling channels 116 facilitates efficient heat removal from the plate 102. The cooling channels 116 here are substantially straight, which can facilitate higher mass flow of coolant through the cooling channels 116 and therefore greater heat removal. Moreover, the plate 102 can include variable-length slotlettes 104 separated by structural ligaments 108, which help to create a strong and stiff plate 102. Depending on the application, these features could provide various advantages, such as the ability to perform longer-duration thrusts using a rocket or other liquid propulsion system.

Although FIGS. 1A and 1B illustrate one example of a slotted MNG 100 with integrated cooling channels 116, various changes may be made to FIGS. 1A and 1B. For example, the relative size and shape of each component in FIGS. 1A and 1B are for illustration only. Each component in the MNG 100 could have any suitable size, shape, and dimensions. Also, the arrangement of the slotlettes 104 in FIGS. 1A and 1B is for illustration only. An MNG could have any suitable number of slotlettes 104 in any suitable arrangement.

Figure 2:
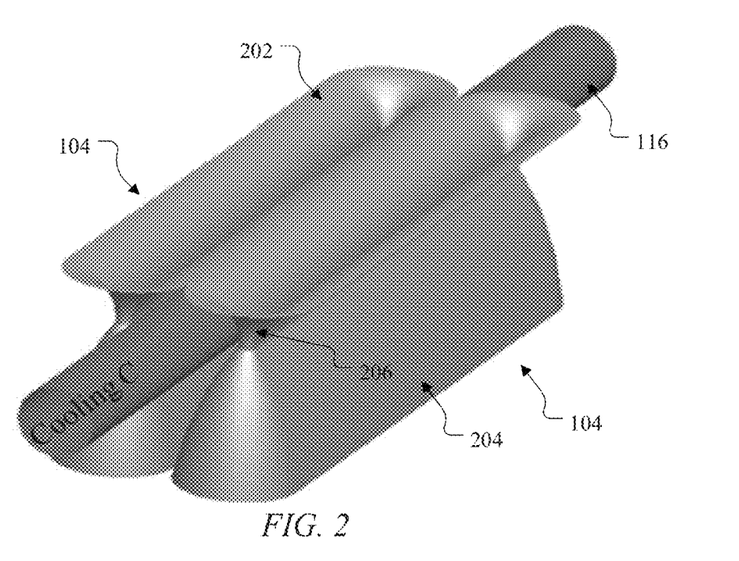
FIGS. 2 through 4 illustrate example components in a slotted MNG in accordance with this disclosure.
Figure 4:
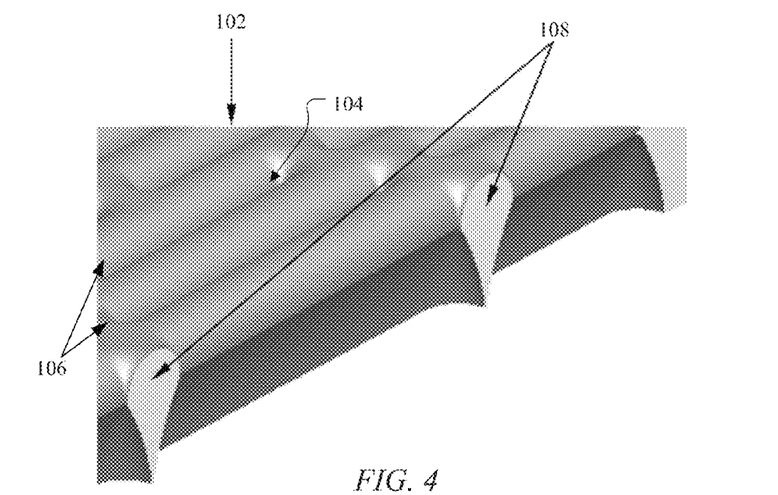

FIGS. 2 through 4 illustrate example components in a slotted MNG 100 in accordance with this disclosure. As shown in FIG. 2, two slotlettes 104 are shown along with a cooling channel 116. A conventional MNG nozzlette's geometry is typically a revolved surface. The geometry of a slotlette 104 can be viewed as a conventional nozzlette that is cut in half and translated (stretched) to a desired length, where surfaces connect the two halves so that the surfaces are tangent to the edges of the halves and form the desired slotlette 104. In FIG. 2, each slotlette 104 includes a convergent input 202 and a divergent output 204. Both the convergent input 202 and the divergent output 204 have substantially straight sides and rounded ends, and the divergent output 204 has a larger height than the convergent input 202. Each slotlette 104 also includes a narrower throat portion 206 that separates the convergent input and the divergent output and that allows expansion of gases from the convergent input 202 into the divergent output 204, providing acceleration.

As shown in FIGS. 2 and 3, each of the cooling channels 116 is located between adjacent rows 106 of slotlettes 104. In particular, slotlettes in adjacent rows 106 have convergent inputs 202 that angle towards one another, divergent outputs 204 that angle towards one another, and a cooling channel 116 that resides within the area between the convergent inputs 202 and divergent outputs 204 of the slotlettes in adjacent rows. In some embodiments, the cooling channels 116 represent areas of the plate 102 that have been removed, such as via drilling or other suitable processing technique. Here, the cooling channels 116 traverse across the plate 102 so that during combustion, for example, heat generated in a combustion chamber is transferred through the plate 102 into the coolant flowing through the cooling channels 116. The unique geometry of the slotlettes 104 allows the cooling channels 116 to pass through the plate 102 from one side and exit through the other side. This transfers heat from the convergent side of the plate 102 through the walls of the otherwise solid plate 102 and into the cooling channels 116.

FIG. 4 illustrates an example of the structural ligaments 108 in the MNG 100. Each structural ligament 108 shown is bounded by the end of one slotlette 104 in a row 106 and the beginning of another slotlette 104 in the same row 106. The material between the slotlettes 104 provides the structural material for strength and stiffness of the plate 102. Each structural ligament 108 here has a tear-drop shape in cross-section, and the design of the tear-drop shape can be modified depending on the application.

Although FIGS. 2 through 4 illustrate examples of components in a slotted MNG 100, various changes may be made to FIGS. 2 through 4. For example, the slotlettes 104 could have any suitable size and shape. Also, each structural ligament 108 could have any other suitable size and cross-sectional shape. In addition, note that the slotlettes 104 shown here are configured to receive hot gases and direct the hot gases in the same general direction. However, at least some of the slotlettes 104 could have angled portions to direct thrust in other directions.

Figure 5A:
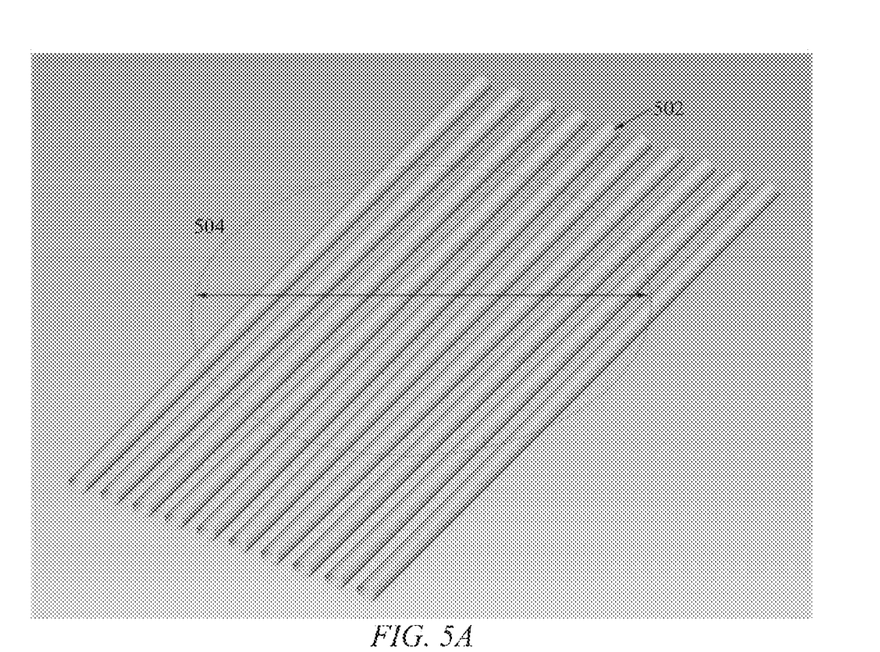
FIGS. 5A through 5I illustrate an example technique for identifying a design geometry of a slotted MNG in accordance with this disclosure.

FIGS. 5A through 5I illustrate an example technique for identifying a design geometry of a slotted MNG in accordance with this disclosure. In this example, the design begins with multiple straight tubes 502 laying side-by-side as shown in FIG. 5A. These tubes 502 denote areas where the cooling channels 116 are to be formed. In some embodiments, the center line of each tube 502 lies in the same plane, the tubes 502 are parallel to each other, there is an equal offset distance between each adjacent pair of tubes 502, and all tubes 502 have the same diameter. The tubes' center-to-center offset and diameter can be determined in any suitable manner, such as based on performance, cooling and structural analysis. Also, the number of slotlette rows and tubes can be determined in any suitable manner, such as the diameter of a port's bounding circle 504 and manufacturing limits.

Figure 5B:
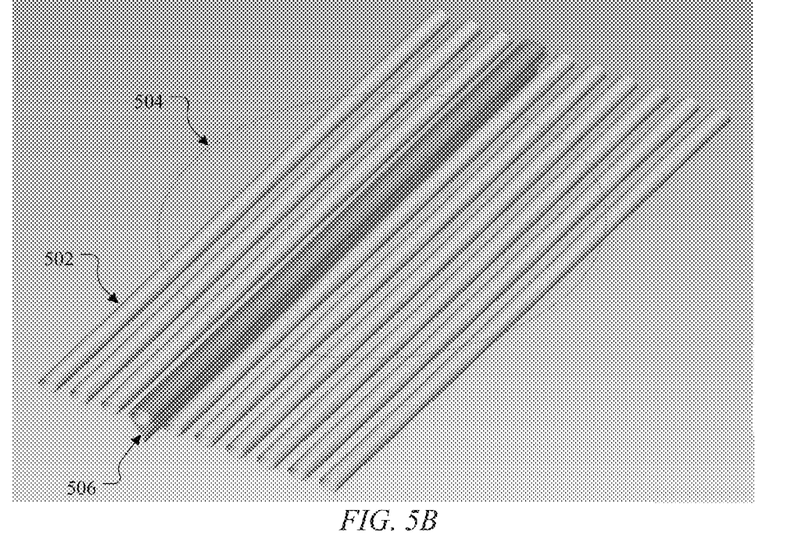
Figure 5C:
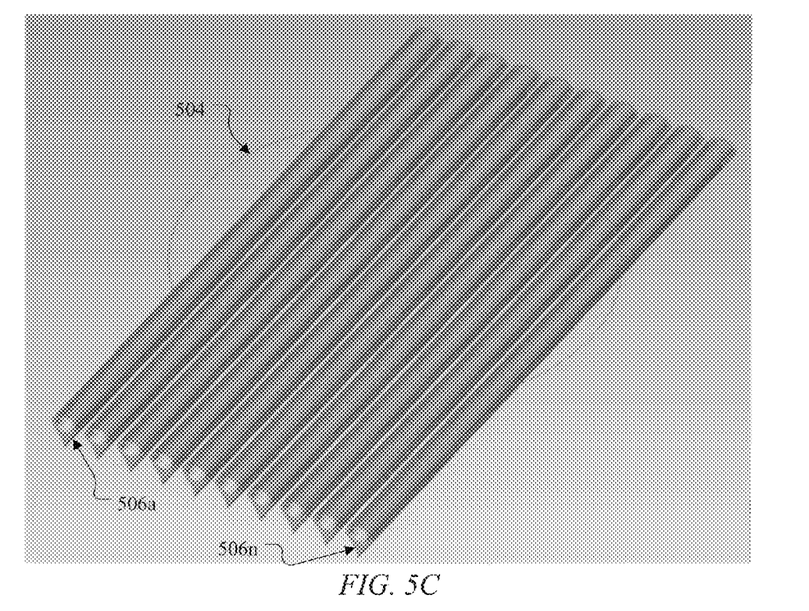
Figure 5D:
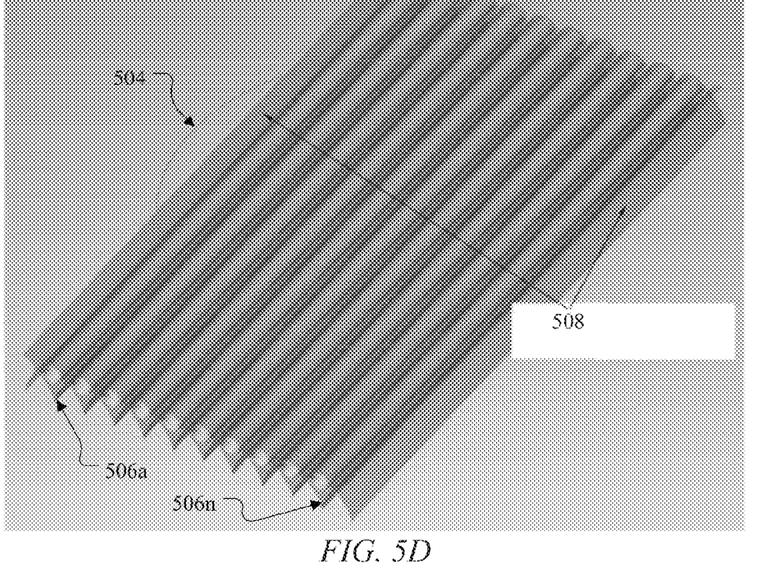

As shown in FIG. 5B, the geometry surrounding each cooling tube 502 forms a structural rib 506. In this example, the structural rib 506 has a tear-drop or airfoil shape in cross-section, which can help to minimize stagnation zones. This structural rib 506 extends across the bounding circle 504 of the port. The rib geometry forms half of one row of slotlettes and half of a neighboring row of slotlettes. Likewise, a tube 502 encased by the structure forms one of the cooling channels 116 described above. This is repeated for each cooling tube 502, creating multiple straight structural ribs 506a-506n as shown in FIG. 5C. Outboard surface slots 508 intersect the bounding circle 504 of the port as shown in FIG. 5D. The outboard surface slots 508 represent "unslotted" areas of the MNG adjacent to the outer cooling tubes 502. With the definition of the outboard surface slots 508, the geometry of the ribs is completed.

Figure 5E:
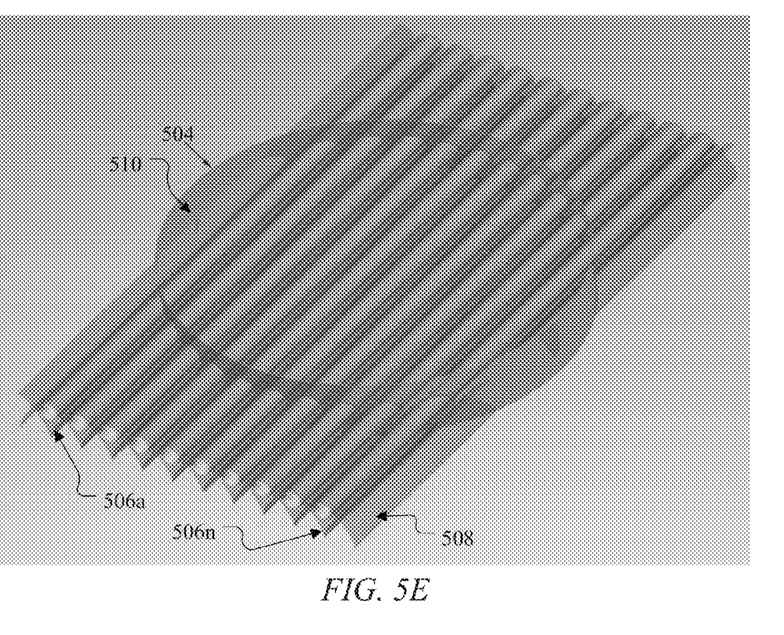
Figure 5F:
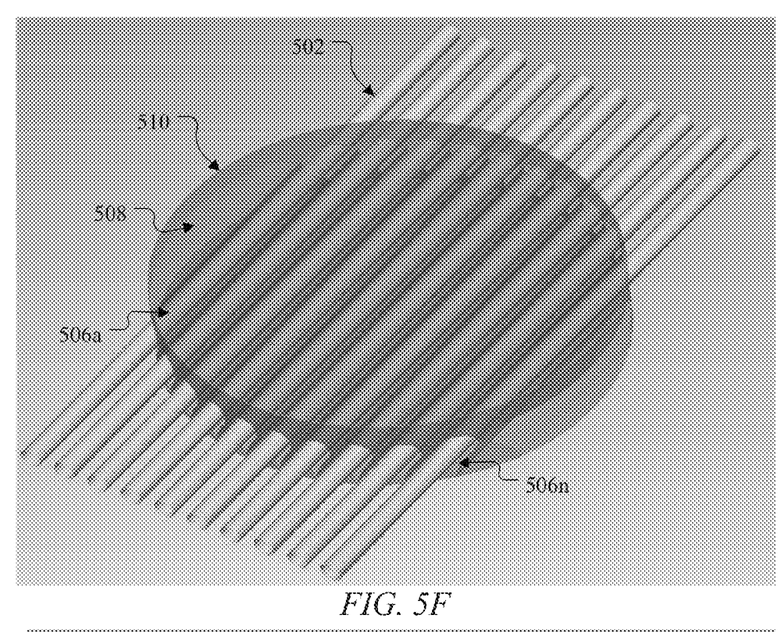

As shown in FIG. 5E, the bounding circle 504 is extended to form a ring 510 around a portion of the ribs 506a-506n. Here, the ring 510 defines the outer limits of the ribs 506a-506n. As shown in FIG. 5F, the geometry of the ribs 506a-506n is bounded by the ring 510, so the ribs 506a-506n no longer extend outside of the ring 510.

Figure 5G:
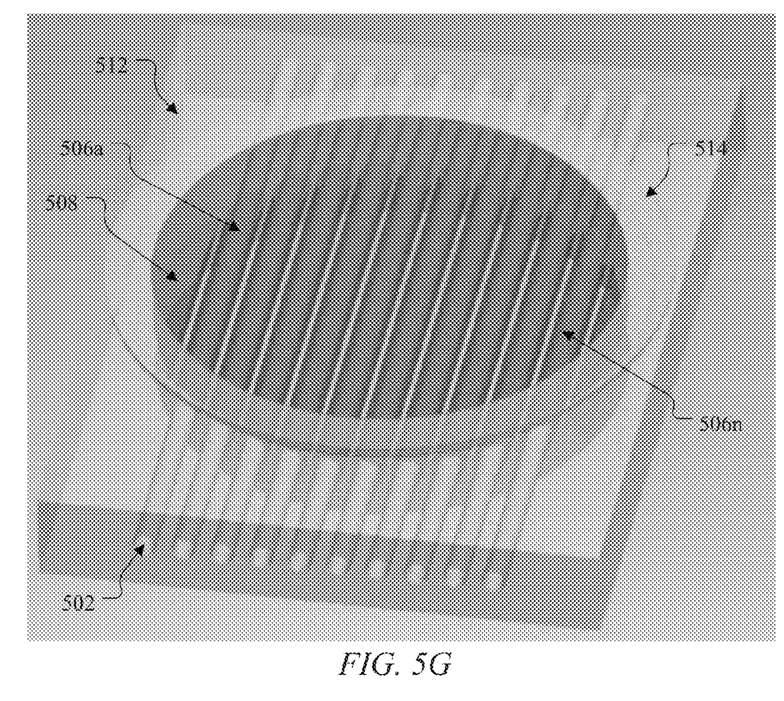
Figure 5H:
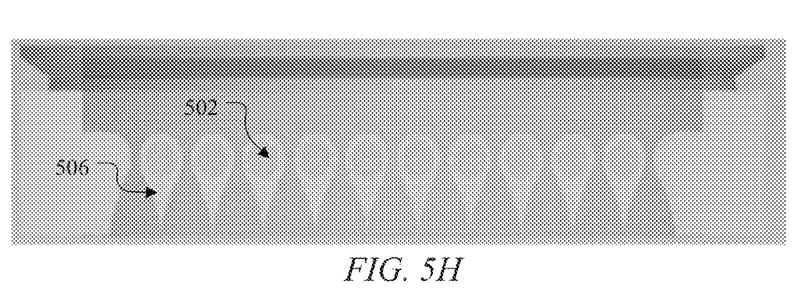

As shown in FIG. 5G, surfaces 512 define the outer geometry of the plate 102. The surfaces 512 therefore identify the solid portions of the plate 102 (which forms the thermal mass), and the cooling tubes 502 traverse the entire length of the plate. The size of the plate 102 may be determined by a tradeoff between how much thermal mass is need versus how much mass can be saved. The side surfaces of the ribs 506a-506n form the walls or outer surfaces of slotlettes to be fabricated. A portion 514 of the plate is raised, which could be sized to fit within a combustion chamber or other structure. FIG. 5H shows a side view of the structure of FIG. 5G, with each cooling cylinder 502 is surrounded by a rib 506. The airfoil or tear-drop shape of the cross section is apparent here.

Figure 5I:
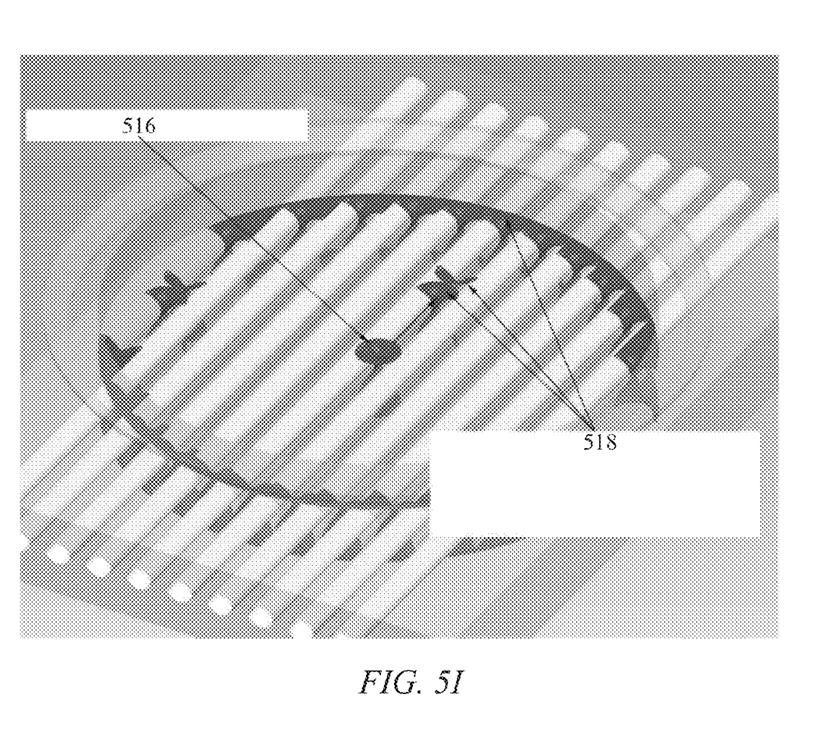

As shown in FIG. 5I, slotlettes are defined between the ribs 506a-506n. A classic nozzlette 516 is shown here for illustrative purposes only. To form a slotlette, the nozzlette 516 can be divided in half, and the halves 518 can be separated from one another. Each slotlette is then formed using two separated halves 518. Each slotlette therefore represents a nozzlette 516 that is stretched in one axis to make a longer slotlette. The ends of each slotlette share the geometry of the structural ligaments 108. As can be seen here, the resulting cooling channels are interdigitated between slotlettes, and slotlettes are of varying length to form the structural ligaments.

Although FIGS. 5A through 5I illustrate one example of a technique for identifying a design geometry of a slotted MNG, various changes may be made to FIGS. 5A through 5I. For example, any other suitable technique could be used to design a slotted MNG.

Figure 6:
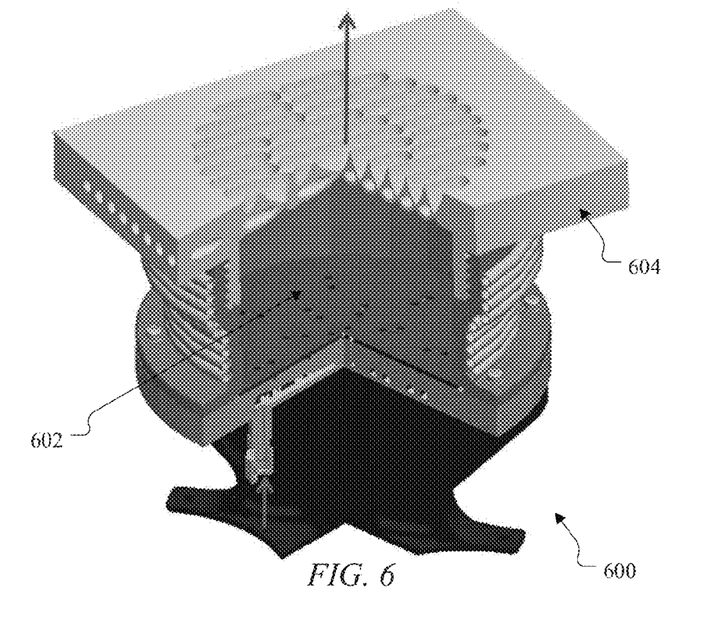
FIG. 6 illustrates an example engine and nozzle assembly of a vehicle with a slotted MNG in accordance with this disclosure.

FIG. 6 illustrates an example engine and nozzle assembly 600 of a vehicle with a slotted MNG in accordance with this disclosure. As shown in FIG. 6, the assembly 600 includes a liquid propulsion system having a combustion chamber 602. An outlet of the combustion chamber 602 is covered by a slotted MNG 604. The slotted MNG 604 could represent the MNG 100 shown in FIGS. 1A and 1B above. As noted previously, a slotted MNG can provide the same or similar functionality as a larger conventional nozzle (such as a cylindrical or conical nozzle) but in a smaller package. In some embodiments, the slotted MNG 604 could have a length that is roughly 20% the length of a conventional nozzle. This can provide significant volume and weight reductions. The remaining components of the assembly 600 are not described here as they do not relate to the use of a slotted MNG.

Although FIG. 6 illustrates one example of an engine and nozzle assembly 600 of a vehicle with a slotted MNG, various changes may be made to FIG. 6. For example, a slotted MNG could be used with any suitable larger device or system, such as any vehicle using a liquid propulsion system.

Figure 7:
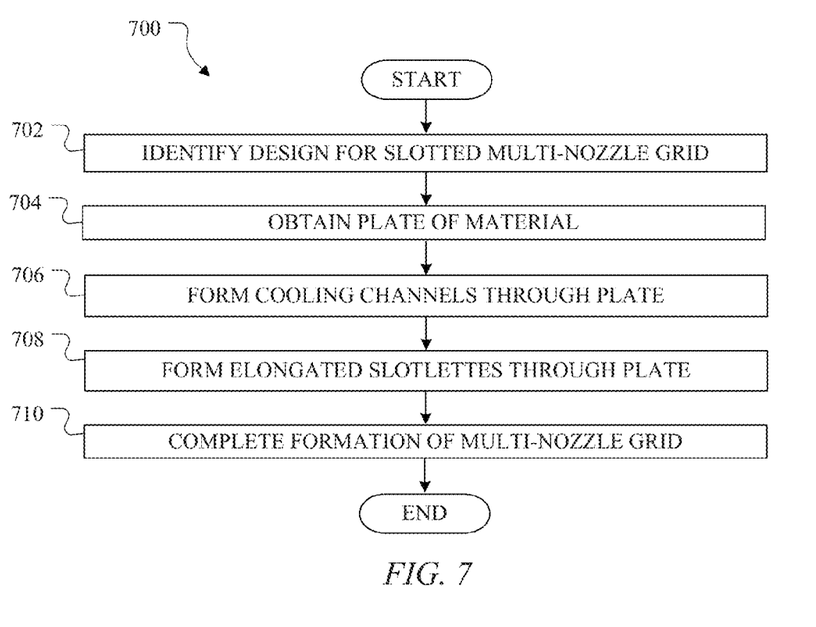
FIG. 7 illustrates an example method for forming a slotted MNG with integrated cooling channels in accordance with this disclosure.

FIG. 7 illustrates an example method 700 for forming a slotted MNG with integrated cooling channels in accordance with this disclosure. As shown in FIG. 7, the design for a slotted MNG is identified at step 702. This could include, for example, using the technique shown in FIGS. 5A through 5I to design a slotted MNG 100. As a particular example, this could include identifying the number and size of multiple cooling channels 116 and the number and arrangement of multiple slotlettes.

A plate of material is obtained at step 704. This could include, for example, forming material into the desired overall shape of the MNG 100. This could be accomplished by machining a piece of material into the desired shape or using a mold to form material into the desired shape.

Cooling channels are formed through the plate at step 706, and elongated slotlettes are formed through the plate at step 708. This could include, for example, drilling or otherwise forming the cooling channels 116 through the plate 102. This could also include machining or otherwise forming the slotlettes 104 through the plate 102. Note that any suitable technique could be used to form each feature of the MNG 100. Formation of the slotted MNG is completed at step 710. This could include, for example, forming flanges 114 or other features of the slotted MNG 100.

Although FIG. 7 illustrates one example of a method 700 for forming a slotted MNG with integrated cooling channels, various changes may be made to FIG. 7. For example, while shown as a series of steps, various steps in each figure could overlap, occur in parallel, or occur in a different order. As a particular example, the MNG 100 could be formed using a mold, and multiple features of the MNG 100 (such as the plate 102 itself along with the cooling channels 116 and/or the slotlettes 104) could be formed at the same time.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The term "elongated" refers to a shape where length is at least twice the distance as width. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a slotted multi-nozzle grid comprising a plate configured to be connected to an outlet of a combustion chamber of a thruster and to allow combustion gases generated in the combustion chamber to flow in a longitudinal direction through the slotted multi-nozzle grid, the plate having a thickness in the longitudinal direction, the plate comprising:
multiple slotlettes that extend through the thickness of the plate, each of the slotlettes elongated in a direction that is generally normal to the longitudinal direction, at least some of the slotlettes arranged in multiple rows and each of the multiple slotlettes having a convergent input, a divergent output, and a narrower throat portion separating the convergent input and the divergent output; and
multiple cooling channels through the plate, at least some of the cooling channels located between the rows of slotlettes, each of the multiple cooling channels configured to transport coolant through the plate in order to cool the plate;
wherein at least some of the rows include two or more of the at least some of the slotlettes.

2. The apparatus of claim 1, wherein two adjacent slotlettes in one row of the at least some of the rows are separated by a structural ligament.

3. The apparatus of claim 2, wherein the structural ligament has a tear-drop cross-sectional shape.

4. The apparatus of claim 1, wherein each convergent input and divergent output has substantially straight sides and rounded ends, each divergent output having a larger height than each convergent input.

5. The apparatus of claim 1, wherein:
the at least some of the slotlettes in two adjacent rows have convergent inputs that angle towards one another and divergent outputs that angle towards one another; and
one of the multiple cooling channels resides within an area between the convergent inputs and the divergent outputs of the at least some of the slotlettes in the two adjacent rows.

6. The apparatus of claim 1, wherein:
the plate further comprises multiple ribs; and
at least some of the ribs form a first portion of the at least some of the slotlettes in one row and a second portion of the at least some of the slotlettes in an adjacent row.

7. The apparatus of claim 6, wherein each of the at least some of the ribs has a tear-drop or airfoil cross-sectional shape.

8. The apparatus of claim 1, wherein each of the multiple cooling channels is substantially straight through the plate.

9. A system comprising:
a thruster comprising a combustion chamber configured to generate combustion gases that flow in a longitudinal direction; and
a slotted multi-nozzle grid connected to an outlet of the combustion chamber of the thruster and through which the combustion gases pass, the slotted multi-nozzle grid comprising a plate having a thickness in the longitudinal direction, the plate comprising:
multiple slotlettes that extend through the thickness of the plate, each of the slotlettes elongated in a direction that is generally normal to the longitudinal direction, at least some of the slotlettes arranged in multiple rows and each of the multiple slotlettes having a convergent input, a divergent output, and a narrower throat portion separating the convergent input and the divergent output; and
multiple cooling channels through the plate, at least some of the cooling channels located between the rows of slotlettes, each of the multiple cooling channels configured to transport coolant through the plate in order to cool the plate;
wherein at least some of the rows include two or more of the at least some of the slotlettes.

10. The system of claim 9, wherein two adjacent slotlettes in one row of the at least some of the rows are separated by a structural ligament.

11. The system of claim 10, wherein the structural ligament has a tear-drop cross-sectional shape.

12. The system of claim 9, wherein each convergent input and divergent output has substantially straight sides and rounded ends, each divergent output having a larger height than each convergent input.

13. The system of claim 9, wherein:
the plate further comprises multiple ribs; and
at least some of the ribs form a first portion of the at least some of the slotlettes in one row and a second portion of the at least some of the slotlettes in an adjacent row.

14. The system of claim 13, wherein each of the at least some of the ribs has a tear-drop or airfoil cross-sectional shape.

15. The system of claim 9, wherein the thruster comprises a portion of a propulsion system on a vehicle.

16. A method of forming a slotted multi-nozzle grid, the method comprising:
obtaining a plate having a thickness in a longitudinal direction;
forming multiple slotlettes that extend through the thickness of the plate, each of the slotlettes elongated in a direction that is generally normal to the longitudinal direction, at least some of the slotlettes arranged in multiple rows and each of the multiple slotlettes having a convergent input, a divergent output, and a narrower throat portion separating the convergent input and the divergent output; and
forming multiple cooling channels through the plate, each of the multiple cooling channels configured to transport coolant through the plate in order to cool the plate;
wherein at least some of the cooling channels are located between the rows of slotlettes;
wherein at least some of the rows include two or more of the at least some of the slotlettes; and
wherein the plate is configured to be connected to an outlet of a combustion chamber of a thruster and to allow combustion gases generated in the combustion chamber to flow in the longitudinal direction through the slotted multi-nozzle grid.

17. The method of claim 16, wherein forming the slotted multi-nozzle grid comprises one of:
   machining the plate to form the multiple slotlettes and the multiple cooling channels; and
   molding material to form the plate along with at least one of the multiple slotlettes and the multiple cooling channels.

18. The method of claim 16, wherein two adjacent slotlettes in one row of the at least some of the rows are separated by a structural ligament.

19. The method of claim 16, wherein:
   the plate further comprises multiple ribs; and
   at least some of the ribs form a first portion of the at least some of the slotlettes in one row and a second portion of the at least some of the slotlettes in an adjacent row.

20. The method of claim 16, wherein the thruster comprises a portion of a propulsion system on a vehicle.

\* \* \* \* \*